United States Patent [19]

Beatty et al.

[11] Patent Number: 5,050,838

[45] Date of Patent: Sep. 24, 1991

[54] CONTROL VALVE UTILIZING MECHANICAL BEAM BUCKLING

[75] Inventors: Christopher C. Beatty, Fort Collins; Jerome E. Beckmann, Loveland, both of Colo.

[73] Assignee: Hewlett-Packard Company, Palo Alto, Calif.

[21] Appl. No.: 560,933

[22] Filed: Jul. 31, 1990

[51] Int. Cl.⁵ ............................................. F16K 31/70
[52] U.S. Cl. ......................................... 251/11; 357/26
[58] Field of Search ...................... 251/11; 357/26, 28

[56] References Cited

U.S. PATENT DOCUMENTS

| | | | |
|---|---|---|---|
| 2,760,303 | 11/1960 | Smallpiece | 251/11 |
| 4,581,624 | 4/1986 | O'Connor | 357/26 |
| 4,809,947 | 3/1989 | Mantwyler | 251/11 |
| 4,821,997 | 4/1989 | Zdeblick . | |
| 4,821,999 | 4/1989 | Ohtaha | 357/26 X |
| 4,824,073 | 4/1989 | Zdeblick . | |

Primary Examiner—John C. Fox
Attorney, Agent, or Firm—William W. Cochran; Guy J. Kelley

[57] ABSTRACT

A valve apparatus for controlling fluid flow comprising a substrate having a first aperture extending therethrough for defining a first fluid flow path; a beam having first and second terminal end portions mounted in fixed relationship with the substrate and having a bucklingly displaceable intermediate portion positioned in overlying relationship with the aperture for covering and uncovering the aperture for preventing or enabling fluid flow through the aperture; and a temperature control assembly for selectively controlling the temperature of the beam for selectively bucklingly displacing the intermediate portion of the beam for controlling fluid flow through the aperture.

14 Claims, 5 Drawing Sheets

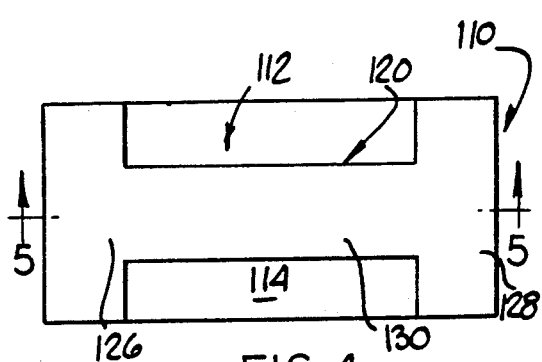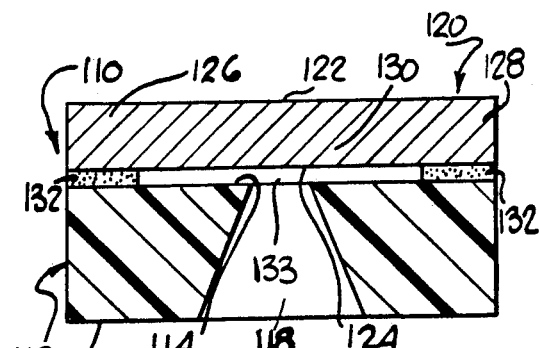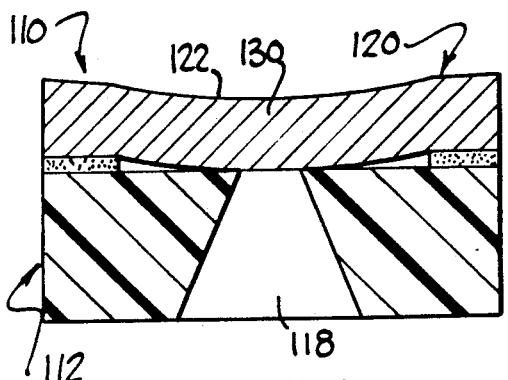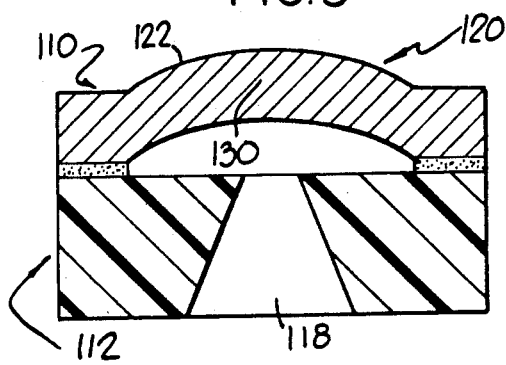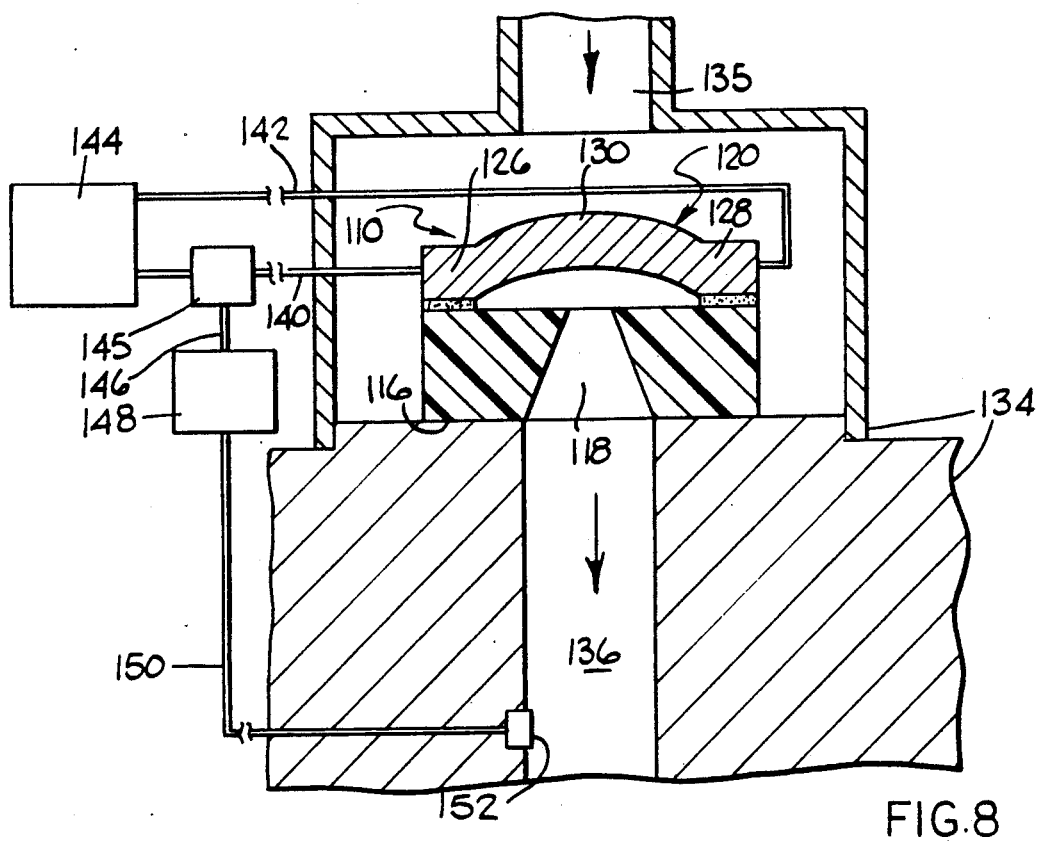

CONTROL VALVE UTILIZING MECHANICAL BEAM BUCKLING

BACKGROUND OF THE INVENTION

The present invention relates generally to control valves and, more particularly to a micro control valve which utilizes mechanical beam buckling to open and close a valve orifice.

In many fluid flow control applications, especially in pneumatic flow control applications, it is desireable to use a control valve which may be actuated quickly and with relatively low energy consumption in response to an electronic control signal. It is also desireable in many applications that the control valve have a relatively small dead volume. Various applications for valves having such characteristics are described in U.S. Pat. Nos. 4,821,997 and 4,824,073 of Mark Zdeblick which are hereby specifically incorporated by reference for all that is disclosed therein.

U.S. Pat. No. 4,824,073 discloses that one known way of controlling the flow of a fluid using an electrical pulse is the electric to fluidic valve developed by Steve Terry of Stanford University. This valve uses a substrate such as silicon which has a thin membrane machined therein. A cavity is formed by the etching of a hole almost completely through the substrate. This leaves a thin bottom wall for the cavity which is used as a flexible membrane. Attached to the side of the first substrate in which the membrane is formed is a second substrate which has a manifold-type cavity etched therein with a passageway or nozzle formed in a wall of the manifold cavity for entering or escaping gas. The manifold cavity also has other ports formed therein to complete a fluid path into the manifold and out the nozzle or vice versa. The manifold cavity in the second substrate is positioned over the membrane of the first substrate such that when the manifold of the first substrate is flexed, it contacts a sealing ring formed around the nozzle of the manifold cavity thereby closing off the fluid flow path between the nozzle and the other ports into the manifold cavity. With the membrane of the first substrate in an unflexed position, the nozzle in the manifold cavity would not be pinched off, and fluid would be free to flow through the input port and the manifold cavity and out through the nozzle or vice versa. The membrane of the first substrate is forced to flex by mechanical forces exerted thereon by a piston. This piston is driven by a solenoid or other type of electromagnetic device.

One disadvantage of the above described valve configuration is that the solenoid requires a high-power source, and is a large power consumer. Further, the solenoid or other electromagnetic device is large and heavy. The cavities in the first and second substrates could be formed with much smaller dimensions if it were not for the fact that the solenoid is large. Because the first and second substrates are silicon wafers which are etched using conventional planar photolithography techniques, it would be possible to make the electric to fluidic valve much smaller in dimension were it not for the solenoid. Such a prior art electric to fluidic valve construction is inefficient in its use of space. Because the solenoid is mechanically attached to the first substrate such that the piston of the solenoid pushes against the membrane in the first substrate and because the solenoid is large enough to consume much of the wafer space, generally only three such valve structures can be formed on a single silicon wafer. Such a structure is relatively expensive to build, and the bond between the solenoid and the glass is difficult to make. Generally, the solenoid is attached to a thick pyrex wafer by nuts and bolts. This form of attachment is both expensive to fabricate and a major source of failures. Further, such a structure has a moving part which can be another source of failure. The principal defect of such a structure, however, is the fact that the entire structure cannot easily be mass-produced with planar lithography techniques. This is because the solenoid cannot be manufactured by such techniques.

U.S. Pat. No. 4,824,073 also discloses an electric to fluidic valve utilizing the principle of expansion and pressure rise of a fixed volume of gas or fluid when heated to deflect a flexible wall or thin membrane forming one or more walls of the cavity in which the gas or fluid is contained. The deflection of the membrane may be used to seal or unseal a fluid passageway from an input port, through a manifold cavity and out an output nozzle or vice versa. The valve may also be operated linearly to provide a linear range of fluid control, i.e., the valve may be controlled to modulate the rate of fluid flow through the valve in accordance with the magnitude of a control signal. The deflection of the membrane may also be used as a sensor indication for purposes of determining temperature changes or the magnitude of other phenomena to be measured.

The principal elements of each design will include a cavity formed in a substrate where one wall of the cavity is a thin, flexible membrane. The cavity encloses a fixed number of moles of gas or fluid, and there will be some method or means of raising the temperature of the fluid in the cavity so as to cause the vapor pressure to rise in the case of a fluid or to cause expansion and increased pressure in the case of a gas. This heating of the material in the cavity may be accomplished in any one of a number of ways. One way is the use of a resistive heating element on one wall of (in the case of diffused resistors, in one or more walls) or located somewhere inside the volume of the cavity such that electrical current may be passed through the resistive element to generate heat and heat the fluid trapped in the cavity.

A typical structure utilizes a silicon-pyrex sandwich for the membrane cavity and heating structure. The membrane chamber is formed in a silicon wafer by etching a trench in the wafer substantially completely through the silicon wafer but stopping short of the opposite side of the wafer by a margin which is equal to the desired thickness of the membrane of the membrane chamber. Other signal processing circuitry, such as power transistors or full feedback control systems with multiplexed input and output ports, may have been previously fabricated on the balance of the wafer in conventional processing. This circuitry can be used in conjunction with the electric to fluidic valve formed by the membrane chamber thereby forming a valve or transducer with its own interface circuitry located on the same silicon wafer as the valve itself using compatible processing steps. The same of course is true for sensor applications where the membrane chamber is used as a transducer. The signal processing or other circuitry built elsewhere on the wafer may then be used to signal process, condition or otherwise deal with the output signal from the transducer for their operation.

The surface of the silicon substrate having the membrane as part thereof is sandwiched with another wafer in which a manifold having an input port and a nozzle is formed (the nozzle may be the input port and the other port may be the output port also). The fluid manifold position is keyed so that when the second wafer is attached to the first wafer, the nozzle and a sealing ring around same are located within the path travelled by the membrane during deflection. Deflections of the membrane change the cross-sectional area of the fluid communication path between the input port and the output port of the fluid manifold. If the deflection is large enough, the membrane seats completely on the sealing ring around the nozzle and completely cuts off flow through the nozzle.

A problem with the above described valve of U.S. Pat. Nos. 4,824,073 and 4,821,997 is that the fabrication process, including the encapsulation of a volume of fluid within a sealed enclosure involves a large number of process steps. It would thus be generally desirable to provide a micro control valve for use in a wide variety of applications including those described for the micro valve of U.S. Pat. Nos. 4,824,073 and 4,821,997 but which is more easily fabricated and less expensive to produce than the micro valves described in those patents.

SUMMARY OF THE INVENTION

The present invention is directed to a valve apparatus for controlling fluid flow. The valve comprises a substrate having an aperture extending therethrough which defines a fluid flow path. A beam having first and second terminal end portions is mounted in fixed relationship with the substrate. A bucklingly displaceable intermediate portion of the beam is positioned in overlying relationship with the aperture for covering and uncovering the aperture for preventing or enabling fluid flow through the aperture. A temperature control assembly is used to control the temperature of the beam so as to selectively bucklingly displace the intermediate portion of the beam to control fluid flow through the aperture. The temperature control assembly may include a relatively low power electrical power source which provides energy to a resistor positioned near the beam or, alternatively, which passes a current through the beam to heat the beam.

The invention may also comprise a method of controlling fluid flow through an orifice including the steps of mounting a beam in overlying relationship with the orifice with end portions of the beam positioned in fixed relationship with the orifice; and controlling the temperature of the beam so as to selectively deform the beam so as to selectively cover or uncover the orifice.

The invention may also comprise a method of making a control valve including the steps of forming an aperture through a substrate member; mounting an intermediate portion of a beam member in overlying, coveringly and uncoveringly deformably displaceable relationship with the aperture; and providing an assembly for controllably heating the beam member.

BRIEF DESCRIPTION OF THE DRAWINGS

An illustrative and presently preferred embodiment of the invention is shown in the accompanying drawings in which:

FIG. 4 is a top plan view of another embodiment of a microvalve.

FIG. 5 is a cross-sectional elevation view of the microvalve of FIG. 4 with a beam portion thereof in an undeformed position associated with a partially open state of the valve.

FIG. 6 is a cross-sectional elevation view of the microvalve of FIG. 4 with a beam portion thereof in a first buckled position associated with a closed state of the valve.

FIG. 7 is a cross-sectional elevation view of the microvalve of FIG. 4 with a beam portion thereof in a second buckled position associated with a fully open state of the valve.

FIG. 8 is a cross-sectional elevation view of the microvalve of FIG. 4 in use in a fluid flow line with electronic control devices associated with the valve shown schematically.

DETAILED DESCRIPTION OF THE PREFERRED EMBODIMENTS OF THE INVENTION

Figures 1, 2, 3:
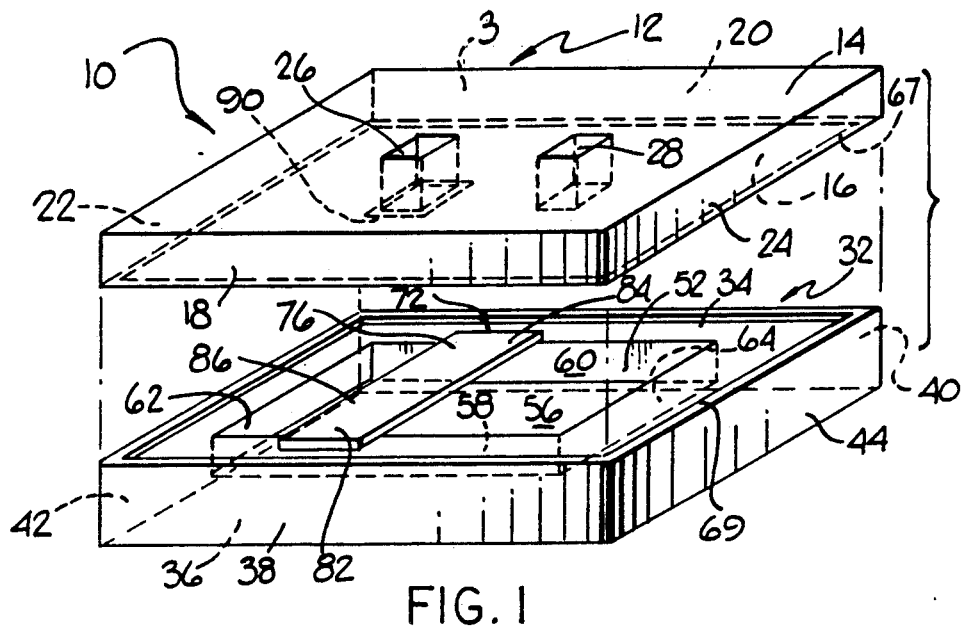
FIG. 1 is an exploded perspective view of a microvalve.
FIG. 2 is a cross sectional elevation view of the microvalve of FIG. 1.
FIG. 3 is another cross sectional elevation view of the microvalve of FIG. 1.

FIGS. 1–3 illustrate a microvalve apparatus 10 for controlling flow of fluids. The valve apparatus comprises a substrate 12 having a first aperture 26 extending therethrough which defines a first fluid flow path. A beam 72 having first and second terminal end portions 82, 84 and an intermediate portion 86 is mounted adjacent the first substrate 12 with the intermediate portion thereof positioned in overlying relationship with the aperture 26 and with the terminal end portions 82, 84 thereof held in fixed relationship with the substrate 12. The intermediate portion 86 is bucklingly displaceable and capable of covering or uncovering the aperture 26 to prevent or enable fluid flow through the aperture. A temperature control assembly 96, 98, etc. is used for selectively controlling the temperature of the beam 72 for selectively bucklingly displacing the intermediate portion 86 thereof for controlling fluid flow through the aperture 26. The phrase "buckling displacement" as used herein refers to lateral displacement which occurs at an intermediate portion of a beam which is fixed at both ends as a result of a change in the longitudinal dimension of the beam. In beam 72, buckling displacement occurs as a result of thermal expansion. Having thus described the valve apparatus 10 in general, various features of the valve apparatus will now be described in greater detail.

As illustrated in FIG. 1, microvalve 10 comprises a first substrate 12 which may be generally parallelepiped-shaped. Substrate 12 has a top surface 14, a bottom surface 16, a front surface 18, a rear surface 20, a left side surface 22, and a right side surface 24. In one exemplary embodiment, in a completed chip, the first substrate 12 has a length of 4 mm, a width of 6 mm, and a thickness of 0.38 mm. A first aperture 26 extending between the top surface 14 and bottom surface 16 defines a valve outlet orifice. A second aperture 28 extending between the top surface and bottom surface of the substrate defines a valve inlet orifice. In one exemplary embodiment, each of the apertures 26, 28 comprise a cross sectional opening area of approximately 0.04 mm².

A second substrate 32 which may also have a generally parallelepiped shape comprises a top surface 34, a bottom surface 36, a front surface 38, a rear surface 40, a left surface 42, and a right surface 44. A cavity 52 is provided in the second substrate 32 extending downwardly from top surface 34. The cavity 52 is defined by a cavity bottom surface 56, front surface 58, rear surface 60, left surface 62, and right surface 64. The second substrate 32 may have the same length and width dimensions as the first substrate and may have a thickness of, e.g., 0.38 mm. The cavity 52 may have a length of 1.5 mm, a width of 0.5 mm, and a depth of 0.2 mm. In one preferred embodiment of the invention, each of the substrate members is a silicon substrate.

The first substrate 12 is attached to the second substrate 32 by a peripheral bonding layer 68 which may comprise heat-bonded peripheral sublayers 67, 69 provided on the first and second substrates 12, 32, respectively. Apertures 26 and 28 are positioned such that when the first substrate 12 is attached to the second substrate 32, both apertures communicate with cavity 52 which acts as a plenum chamber.

A generally parallelepiped-shaped beam member 72 has a top surface 76, a bottom surface 78, first and second end portions 82, 84, and an intermediate portion 86. Beam member 72 is sandwiched between the first and second substrates 12, 32 with the end portions 82, 84 thereof held in fixed relationship with the substrates and with the intermediate portion 8 thereof positioned in overlying relationship with aperture 26. In one preferred embodiment, the beam member is integrally formed with the second substrate member 32. In another embodiment, the beam member is separately formed from the substrate members. The beam member may be constructed from the same material as the substrate members or, alternatively, may be constructed from other material such as metal, which conducts electricity and enables the beam member to be heated by passing an electric current therethrough as described in further detail below with reference to FIG. 8. As illustrated in FIGS. 2 and 3, a peripheral ring of gasket material 90 may be positioned about the lower opening of orifice 26 to facilitate sealing closure of the orifice when beam member 72 is positioned in the upwardly deflected position illustrated in phantom lines in FIG. 3. This gasket may have a thickness of approximately 0.001 mm. As illustrated in FIG. 5, heating resistors 96, 98 may be positioned at either end 82, 84 of beam member 72 and may be attached, as by pad regions 83, 85, to an electrical current source such as described below at 140, 142, 144 with reference to FIG. 8. The resistors may each comprise 10 ohm resistors formed from a 0.0002 mm thick layer of titanium and may each be switchably connected to a 5 volt power source for the purpose of selectively heating beam member 72 in an embodiment of the invention in which the beam member is constructed from 0.02 mm thick nickel.

As illustrated in phantom in FIG. 3, at a relatively low temperature state, e.g. at ambient temperature (70° F.), the beam member 72, as shown in phantom, occupies a relatively flat configuration with the upper surface thereof positioned in engaging relationship with the periphery of aperture 26 or, if gasket material is provided, with the gasket material 90. Fluid pressure within plenum chamber 52 tends to hold the intermediate portion 86 of the beam member in tight sealing relationship with the periphery of aperture 26.

As illustrated in FIG. 2 and in solid lines in FIG. 3, heating of the beam, as through heating of resistors 96, 98, causes the beam to expand and buckle. In a typical embodiment in which the beam is constructed from nickel and in which the heat source is resistors 96, 98 as above-described and in which the fluid flowing through the valve is gas provided at ambient temperature, it may take the beam on the order of 0.1 seconds to reach an elevated temperature of 150° C., sufficient to produce buckling and thus opening of the aperture to the position illustrated in FIG. 3. In an embodiment of the invention in which it is desired to produce an analog-type opening response, the length-to-thickness ratio of the beam is preferably at least 100. In an embodiment of the beam in which a digital-type response, i.e. snap open and snap shut, is desired, the length-to-thickness ratio of the beam is preferably at most 30. As illustrated in FIGS. 2 and 3, the orifices 26, 28 may communicate with a fluid flow line outlet portion 94 and a fluid flow line inlet portion 92, respectively, which may be a cylindrical conduit attached to the upper surface of the first substrate 12 by conventional means.

As illustrated in FIG. 2, more than one inlet 28 may be provided into plenum chamber 52, and those inlets may be provided through the second substrate 32 as well as the first substrate 12.

FIGS. 4–8 illustrate a microvalve 110 of a different embodiment from that shown in FIGS. 1–3. The microvalve 110 includes a single substrate 112 having a top surface 114, a bottom surface 116, and an aperture 118 extending from the top surface to the bottom surface. A beam 120 having a top surface 122, a bottom surface 124, a first end portion 126, a second end portion 128, and an intermediate portion 130 is attached to the top surface of substrate 112 by bonding material 132 provided at the end portions 126, 128 of the beam. The thickness of the bonding material 132 is such that a small gap 134 is provided between the bottom surface 124 of the beam and the top surface 114 of the substrate along the intermediate portion 130 of the beam when the beam is in an unstressed state at ambient temperature. In one exemplary embodiment, the substrate 112 has a length of 4 mm, a width of 6 mm, and a thickness of 0.38 mm, and the aperture extending therethrough has an opening area of 0.4 mm² and may be constructed from silicon. The beam may have a length of 1 mm, a width of 0.4 mm, and a thickness of 0.015 mm, and may be constructed from nickel.

FIG. 8 illustrates use of the microvalve 110 in a supply line 134 having an upstream portion 135 and a downstream portion 136 which may be, for example, portions of a nitrogen supply line for a gas chromatograph.

As further illustrated in FIG. 8, electrical current supply lines 140, 142 are attached to opposite ends 126, 128 of beam 120 and are operably connected at the other ends thereof to an electrical power source 144 which may be a relatively low-power battery, e.g. a 5-volt battery. One of the current supply lines, e.g. 140, may pass through an electronic switching unit 145 which is operably controlled by a controller unit 148 which provides a control signal to the switching unit 145 through lead 146. The control unit 148 in turn receives signals from a flow monitor unit 152 located in flow line 134 downstream from the microvalve 110. The monitor 152 may be a conventional flow rate monitor or a pressure monitor which provides a signal indicative of a predetermined flow parameter such as flow rate or static pressure to controller 148. Controller 148 may be an EPROM chip programmed to compare the monitor signal value to a predetermine target value and to generate a control signal to open or close the control valve in response to deviations in the monitor signal from that target value.

When the beam 120 is in a relatively low temperature state, e.g. ambient temperature, the beam would ordinarily occupy a flat configuration as illustrated in FIG. 5. However, as illustrated in FIG. 6, due to upstream pressure in line 134, e.g. a pressure of 50 psig, the intermediate portion 130 of the beam is urged against the upper surface of the substrate 112 at the periphery of aperture 118 acting to close the aperture and prevent fluid flow therethrough. When electric current is passed through the beam, the resistance of the beam causes the its temperature to become elevated, thereby causing the beam to buckle upwardly to the position illustrated in FIG. 7 in uncovered relationship with aperture 118, enabling flow through aperture 118. In one preferred embodiment of the invention, the electrical energy supplied to the beam may be modulated so as to gradually open or close aperture 118 to maintain a selected flow rate or to maintain another selected flow parameter at a constant value.

Figure 9:
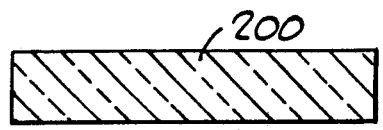
FIGS. 9–16 are cross-sectional elevation views illustrating various stages of the fabrication of a single wafer control valve of the type shown in FIG. 4.

A method of fabricating a one-wafer embodiment of a microvalve 110 of the type illustrated in FIGS. 4–7 will now be described with reference to FIGS. 9–20. As illustrated in FIG. 9, initially a silicon (Si) substrate 200 is provided which may be either a P or N-type silicon substrate which may have a thickness of approximately 400 microns.

Figure 10:
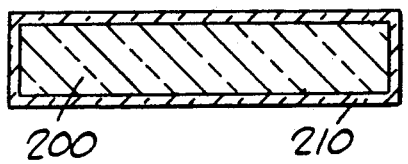

Next, as illustrated in FIG. 10, an oxide ($SiO_2$) 210 is deposited on the silicon substrate 200 to a thickness of between 0.05 microns to 5 microns.

Next, as illustrated in FIG. 3, silicon nitride ($Si_3N_4$) 220 is deposited to a thickness of between 500 and 5000 angstroms (A) using low-pressure chemical vapor deposit (LPCVD).

Figure 12:
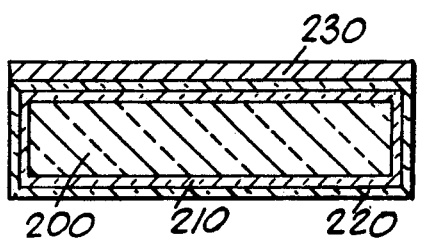

Next, as illustrated in FIG. 12, a top surface layer of titanium 230 is sputter-deposited to a thickness of between 200 and 2000 A.

Figure 13:
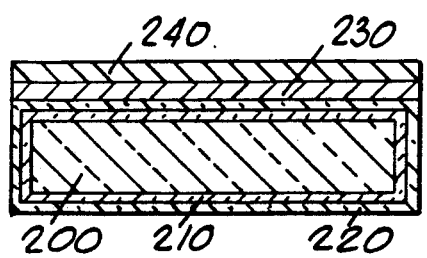

Next, as illustrated in FIG. 13, a layer of nickel (Ni) 240 is electrodeposited on top of the titanium layer to a thickness of between 1 and 100 microns.

Next, a flow hole is patterned on the back side of the wafer using a mask of corresponding shape.

Figure 14:
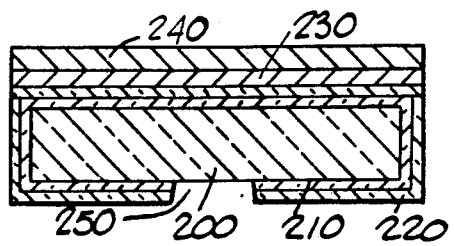

Next, as illustrated in FIG. 14, a first portion of a hole 250 is etched through the silicon nitride and silicon oxide layer using CF-4 plasma.

Figure 15:
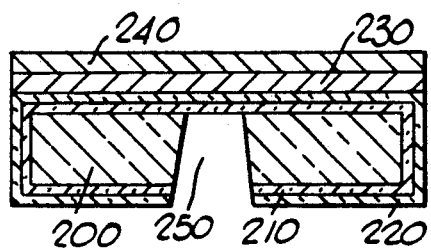
Figure 11:
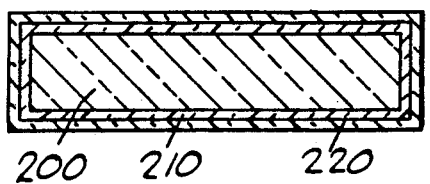

Next, as illustrated in FIG. 15, a further portion of hole 250 is etched through the silicon substrate 200 through the use of a solution of potassium hydroxide (KOH), isopropyl alcohol (ISO), and water.

Figure 16:
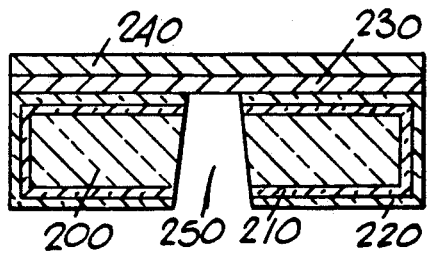
Figure 17:
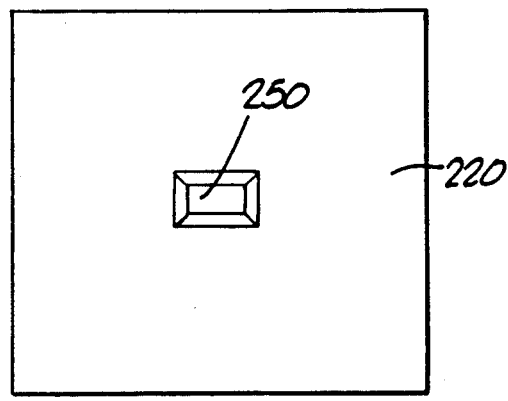
FIG. 17 is a bottom plan view of the fabrication stage shown in FIG. 16.

Next, as illustrated in FIG. 16, the inside layers of silicon nitride and silicon oxide 220, 210 are etched using CF-4 plasma to complete the flow hole 250. FIG. 17 is a bottom plan view illustrating the position of the etched flow hole on the wafer.

Figure 18:
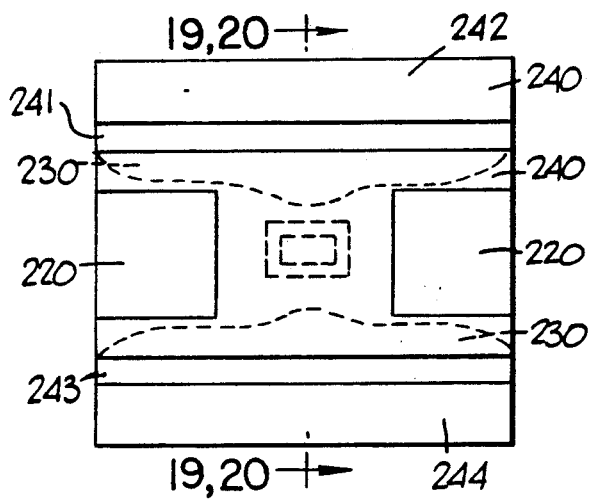
FIG. 18 is a top plan view of a further stage of fabrication of a single wafer valve.
Figure 19:
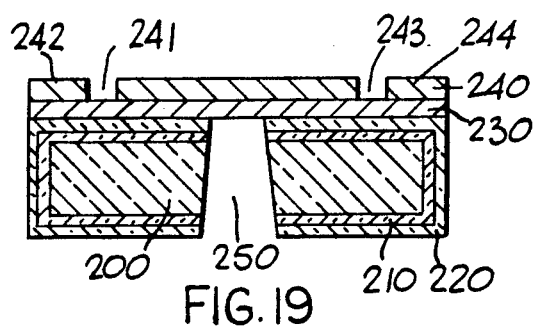
Figure 24:
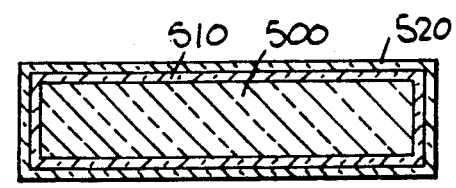
FIGS. 24–31 are cross-sectional elevation views illustrating fabrication stages of one wafer of a two-wafer valve of the type shown in FIG. 1.

Next, as illustrated in FIG. 19 and in solid lines in FIG. 18, the nickel layer 240 is etched using ferric chloric to provide a generally I-shaped pattern. In one preferred embodiment, parallel channels 241, 243 are etched in each end portion of the I-shaped nickel pattern in order to form separate terminal pad portions 242, 244 of the nickel layer from the remainder of the nickel layer for enabling the underlying titanium layer to act as a heating resistor, as discussed in further detail below.

Figure 20:
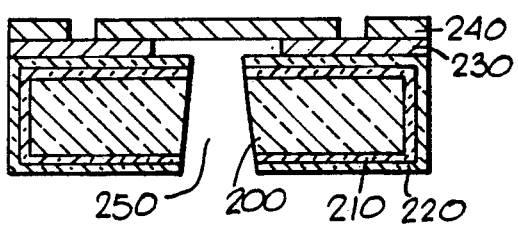

Next, as illustrated in FIG. 20 and in dashed lines in FIG. 18, the exposed portion of the titanium layer, except for the area exposed by channels 241, 243, is etched using dilute hydrofluoric acid. The etching of the titanium is allowed to continue sufficiently to undercut the midportion of the I-shaped nickel layer to the point indicated by the dashed lines in FIG. 18. The etching of the titanium layer thus provides an orifice extending entirely through substrate 200 and coatings 210 and 220, which opening is overlaid by a span of nickel of layer 240 which is bonded at either end to the titanium layer 230. Each of the pad regions in the nickel layer are connected to leads of an electrical power source either by direct contact of the leads with the upper, exposed surfaces of the pads or, more conventionally, through means of a via (not shown) extending vertically through the wafer and contacting an associated nickel pad; the via in turn being attached to a lead of an electrical power supply. In this embodiment, since the nickel layer is substantially thicker than the titanium layer, an electrical current passed through the spanning beam portion of the nickel would create little resistance. However, due to the fact that an electrical current applied to the pad regions of the nickel layer must pass through the titanium layer, and due to the fact that the titanium layer is substantially thinner than the nickel layer, the titanium layer is heated by the passage of the electrical current and acts to heat the nickel beam to produce the necessary buckling action therein. As previously mentioned, other embodiments in which the electrical current is passed through a relatively high-resistance beam enables direct heating of the beam by the electrical current. Other means for heating the beam, such as application of light energy or microwave energy thereto or inductive heating thereof might also be employed.

Figure 22:
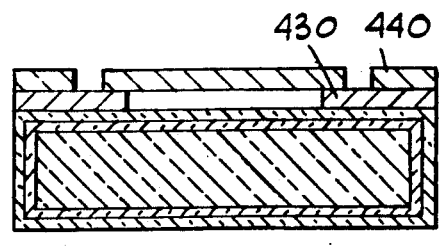
FIGS. 19–23 are cross-sectional elevation views of a fabrication stages following those shown in FIGS. 9–16.
Figure 23:
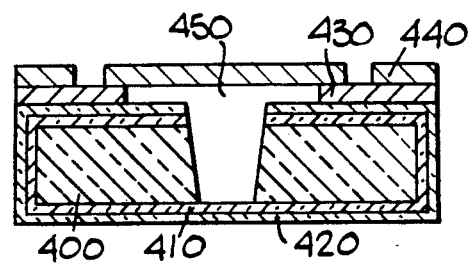
Figure 21:
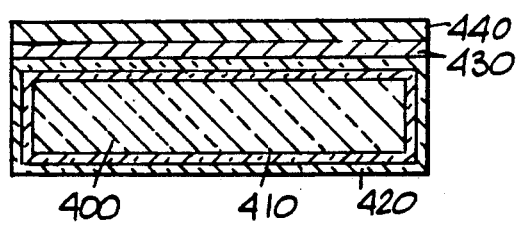

The method of fabricating a two-wafer valve such as that illustrated in FIGS. 1–3 will now be described. Fabrication of a lower wafer corresponding generally to wafer 32 of FIG. 1 will be described first. Initially, as shown in FIG. 21, a wafer is provided comprising a silicon substrate 400, a first surrounding layer of silicon dioxide ($SiO_2$) 410, and a second surrounding layer of silicon nitride ($Si_3N_4$) 420. The top side of the silicon nitride layer had a layer of titanium 430 bonded thereto, and the titanium layer 430 in turn has a nickel layer 440 bonded thereto. This wafer may be formed in the same manner and may have the same layer thicknesses and dimensions as those specified above with reference to FIGS. 9–13. Next, as illustrated in FIG. 22, first the nickel layer 440 then the titanium layer 430 are etched in order to provide nickel pad regions and a nickel beam which is secured at end portions thereof to peripheral regions of the titanium layer 430 in the same manner as described above with reference to FIGS. 18–20. During initial etching of the nickel layer, a peripheral ring of nickel (not shown in FIGS. 22, 23) corresponding to that shown in FIG. 1 at 69 may also be provided through use of a suitable mask. Next, as illustrated in FIG. 23, the silicon nitride layer 420 and the silicon dioxide layer 410 and subsequently the silicon substrate 400 are etched to provide a cavity 450 below the nickel beam using the same chemical etching process as described above with reference to FIGS. 14 and 15.

The method of forming an upper wafer, corresponding generally to wafer 12, of a two-wafer valve such as described at 10 in FIG. 1 will now be described. Initially, a wafer comprising a silicon substrate core 500, a first encompassing coating of silicon dioxide 510, and a second encompassing coating of silicon nitride 520 is provided, as by the method discussed above with reference to FIGS. 9–11, which may have the same dimensions as those indicated for the composition of FIG. 11.

Figure 25:
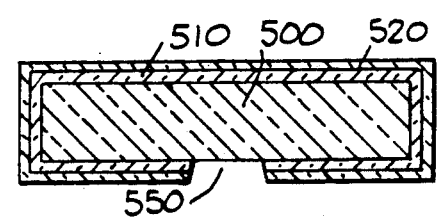
Figure 26:
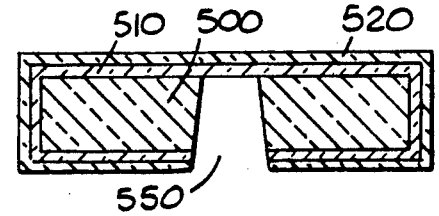

Next, as illustrated in FIG. 25, a portion of a portion of a flow hole 550 corresponding generally to opening 26 of FIG. 1 is provided by patterning and etching the silicon nitride coating 520 and the silicon dioxide coating 510 at a predetermined position through use of etching materials such as those described above. Next, as illustrated in FIG. 26, the hole is continued by etching the silicon layer 500.

Figure 27:
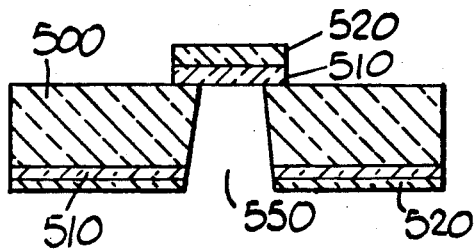

Next, as illustrated in FIG. 27, a boss is patterned on the side of the wafer opposite from the side on which the hole was initially etched, and the silicon nitride and silicon dioxide layers 520, 520 lying outside the boss pattern are etchingly removed from this side of the wafer.

Figure 28:
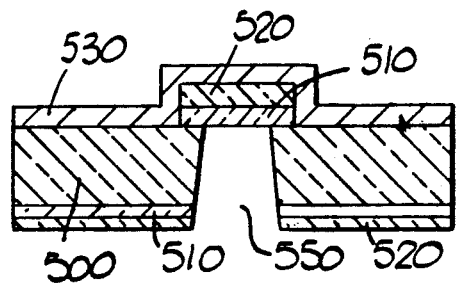
Figure 29:
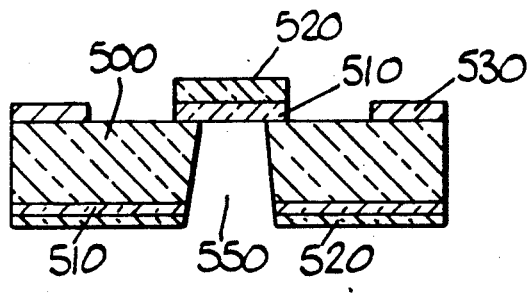

Next, as illustrated in FIG. 28, a layer of indium is sputter-deposited to a thickness of, e.g., 0.001 mm which is less than the total thickness of the remaining silicon dioxide and silicon nitride layers 510, 520. Next, the indium layer is patterned and etched as through the use of hydrochloric acid so as to provide a peripheral ring of indium corresponding to ring 67 shown in FIG. 1.

Figure 30:
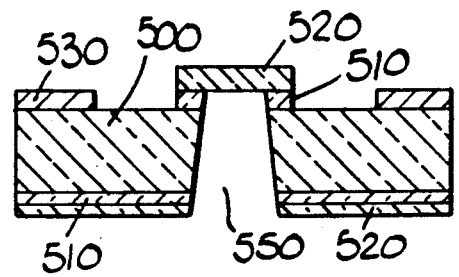
Figure 31:
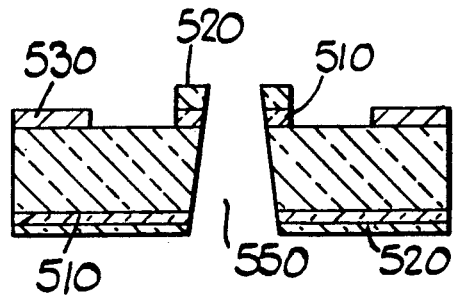

Next, as illustrated in FIG. 30, returning to the other side of the wafer, the silicon dioxide layer 510 and then, as illustrated in FIG. 31, the silicon nitride layer 520 is etched in the region opposite the existing hole through the silicon layer 500 so as to provide a hole 550 entirely through the wafer which is surrounded on one side with a peripheral ring of silicon dioxide 510 and silicon nitride 520 which corresponds to boss 90 in FIGS. 1–3.

As a final step, the wafer of FIG. 31 is flipped over and placed in contact with the lower wafer with the indium peripheral ring of the upper wafer in contact with the nickel peripheral ring of the lower wafer and with the opening through the upper wafer positioned in registry with the beam provided in the lower wafer. The two wafers are then heated, e.g. at 160° C. for 30 minutes to provide bonding.

Electrodes may be attached to the pad regions of the nickel layer as by vias provided through either the upper or lower wafer.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A valve apparatus for controlling fluid flow comprising:

first substrate means having a first aperture extending therethrough for defining a first fluid flow path;

beam means having first and second terminal end portions mounted in fixed relationship with said substrate means and having a bucklingly displaceable intermediate portion positioned in overlying relationship with said aperture for covering and uncovering said aperture for preventing or enabling fluid flow through said aperture;

temperature control means for selectively controlling the temperature of said beam means for selectively bucklingly displacing said intermediate portion of said beam means for controlling fluid flow through said aperture;

said aperture extending between a first face surface and a second face surface of said substrate means;

said beam means first and second terminal end portions being attached to said first face surface of said substrate means;

said beam means comprising a first surface which is positioned remote from said substrate means and a second surface disposed generally parallel to said first surface and positioned proximate to said substrate means; said beam means further comprising:

an inwardly buckled position wherein said intermediate portion is positioned in sealed covering relationship with said aperture and wherein said first surface of said beam means has a generally concave contour;

an outwardly buckled position wherein said intermediate portion is positioned in relatively widely spaced apart, uncovering relationship with said aperture and wherein said first surface of said beam means has a generally convex contour; and a neutral position wherein said intermediate portion is positioned in relatively narrowly spaced apart, uncovering relationship with said aperture and wherein said first surface of said beam means has a relatively flat contour.

2. The invention of claim 1:

said temperature control means comprising heating means for selectively heating said beam means.

3. The invention of claim 2 said heating means composing an electrical circuit means for passing an electrical current through said beam means.

4. The invention of claim 2 said heating means comprising electrical circuit means for passing an electrical current through at least one resistor positioned adjacent to said beam means.

5. The invention of claim 1:

said valve apparatus being installed in a flow line having a relatively higher pressure upstream end and a relatively lower pressure downstream end with said first surface of said beam means positioned relatively upstream from said second surface thereof;

wherein fluid pressure in said flow line normally holds said beam means in said inwardly buckled position during a relatively low temperature state of said beam means; and wherein said beam means is deflectable from said inwardly buckled position to said outwardly buckled position through application of heat to said beam means by said temperature control means.

6. The invention of claim 1 said first substrate means comprising a silicon substrate.

7. The invention of claim 1 wherein said beam means comprises an integrally formed portion of said first substrate means.

8. The invention of claim 1 wherein said beam means comprises a relatively large length-to-thickness ratio and wherein said temperature control means comprises modulated heating means for progressively, adjustably controlling the temperature of said beam means for progressively, adjustably controlling the flow rate of fluid through said aperture.

9. The invention of claim 8 wherein said length-to-thickness ratio is at least 100.

10. The invention of claim 1 wherein said beam means comprises a relatively small length-to-thickness ratio and wherein said temperature control means comprises pulsed heating means for rapidly changing the temperature of said beam means for rapidly, covering said aperture means or uncovering said aperture means by a preset amount for rapidly terminating or enabling flow of fluid through said flow line.

11. The invention of claim 10 wherein said length-to-thickness ratio is at most 30.

12. A method of controlling fluid flow comprising the steps of:
    coating a substrate with at least one layer of coating material;
    forming a beam from a portion of said coating layer, leaving opposite end portions of said beam integrally attached to said substrate;
    forming an orifice extending through said substrate layer which is positioned below a midportion of said beam;
    mounting said substrate with said integrally attached beam in a fluid flow line with fluid communication between upstream and downstream portions of the fluid flow line provided only by said orifice formed in said substrate; and
    controlling the temperature of the beam so as to selectively deform the beam so as to selectively cover or uncover the orifice.

13. A method of making a control valve comprising the steps of:
    coating a substrate with at least one layer of coating material;
    forming a beam from a portion said coating layer, leaving opposite end portions of said beam integrally attached to said substrate;
    forming an orifice extending through said substrate layer which is positioned below a midportion of said beam; and
    providing an assembly for controllably heating the beam member.

14. A microvalve comprising:
a) a composite wafer comprising:
   i) a substrate;
   ii) at least one coating layer integrally bonded to said substrate;
b) said at least one coating layer being patterned to define a beam having end portions integrally bonded to said substrate and having a midportion which is deformably displaceable relative said substrate;
c) said substrate comprising an aperture extending therethrough positioned in alignment with said midportion of said beam;
d) said beam being selectively thermally deformable for covering and uncovering said aperture for terminating and initiating fluid flow through said aperture.

* * * * *